United States Patent
Swaggert

Patent Number: 5,097,609
Date of Patent: Mar. 24, 1992

[54] PORTABLE DRAFT BAR

[76] Inventor: Patrick J. Swaggert, 609 E. Minnehaha Pkwy., Minneapolis, Minn. 55417

[21] Appl. No.: 627,308

[22] Filed: Dec. 14, 1990

[51] Int. Cl.$^5$ .............................................. E02F 3/76
[52] U.S. Cl. .............................. 37/117.5; 37/DIG. 3; 37/DIG. 12; 414/607; 280/292
[58] Field of Search ....... 37/117.5, DIG. 3, DIG. 12, 37/DIG. 15, 118 A; 414/722, 607; 280/415.1, 416.1, 292, 491.2, 501, 500, 495; 172/273

[56] References Cited

U.S. PATENT DOCUMENTS

| | | | |
|---|---|---|---|
| 2,362,991 | 11/1944 | Dahl | 414/607 |
| 2,473,505 | 6/1949 | Brock | 37/DIG. 3 |
| 2,500,887 | 3/1950 | Trissler | 37/117.5 |
| 2,772,918 | 12/1956 | Klinger | 414/607 |
| 2,856,204 | 10/1958 | Graham | 280/491.2 |
| 3,207,085 | 9/1965 | Burr | 414/607 |
| 3,583,061 | 6/1971 | Adams | 414/607 |
| 3,587,893 | 6/1971 | Laken | 414/607 |
| 3,717,362 | 2/1973 | Johnson | 280/500 |
| 3,908,844 | 9/1975 | Duffield | 37/DIG. 3 |
| 3,922,006 | 11/1975 | Borges | 280/416.1 |
| 3,989,404 | 11/1976 | Burton | 37/DIG. 3 |
| 4,037,681 | 7/1977 | Gorby | 37/DIG. 3 |
| 4,125,952 | 11/1978 | Jennings | 37/DIG. 3 |
| 4,189,854 | 2/1980 | Haynes | 37/117.5 |
| 4,202,562 | 5/1980 | Sorenson | 280/415.1 |
| 4,242,035 | 12/1980 | Hornstein | 37/117.5 |
| 4,422,819 | 12/1983 | Guest | 37/117.5 |
| 4,568,098 | 2/1986 | Landry, Jr. | 280/416.1 |
| 4,813,164 | 3/1989 | Morrell | 37/DIG. 3 |
| 4,819,349 | 4/1989 | Mensch | 37/117.5 |

FOREIGN PATENT DOCUMENTS

| | | | |
|---|---|---|---|
| 1084706 | 9/1980 | Canada | 37/DIG. 3 |
| 2118136 | 10/1983 | United Kingdom | 414/607 |

Primary Examiner—Randolph A. Reese
Assistant Examiner—Spencer Warwick
Attorney, Agent, or Firm—Warren A. Sturm

[57] ABSTRACT

A portable draft bar is demountably attached to a horizontally disposed surface of an earth-working implement that is adjustably disposed on an earthmoving vehicle by providing an elongated draft bar that is adapted at its rear end to be driveably attached to the rear portion of a horizontally-disposable surface of an earth-working implement, such as a front end loader, and which is slidably disposed in a clamp adapted to be clamped to a forward portion of the work surface so as to provide three-dimensional stability and connection of the draft bar to the vehicle for use as, for example, in moving trailers and the like.

7 Claims, 3 Drawing Sheets

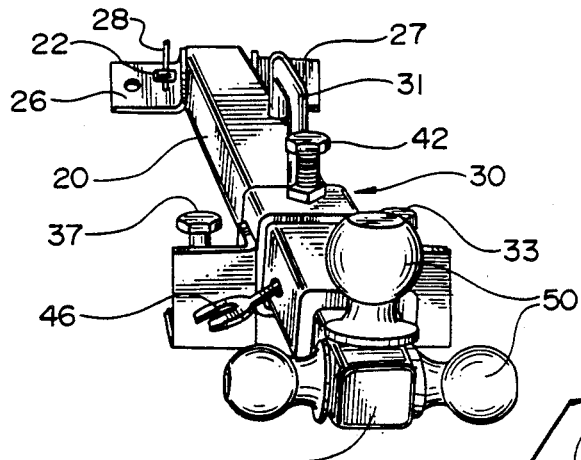
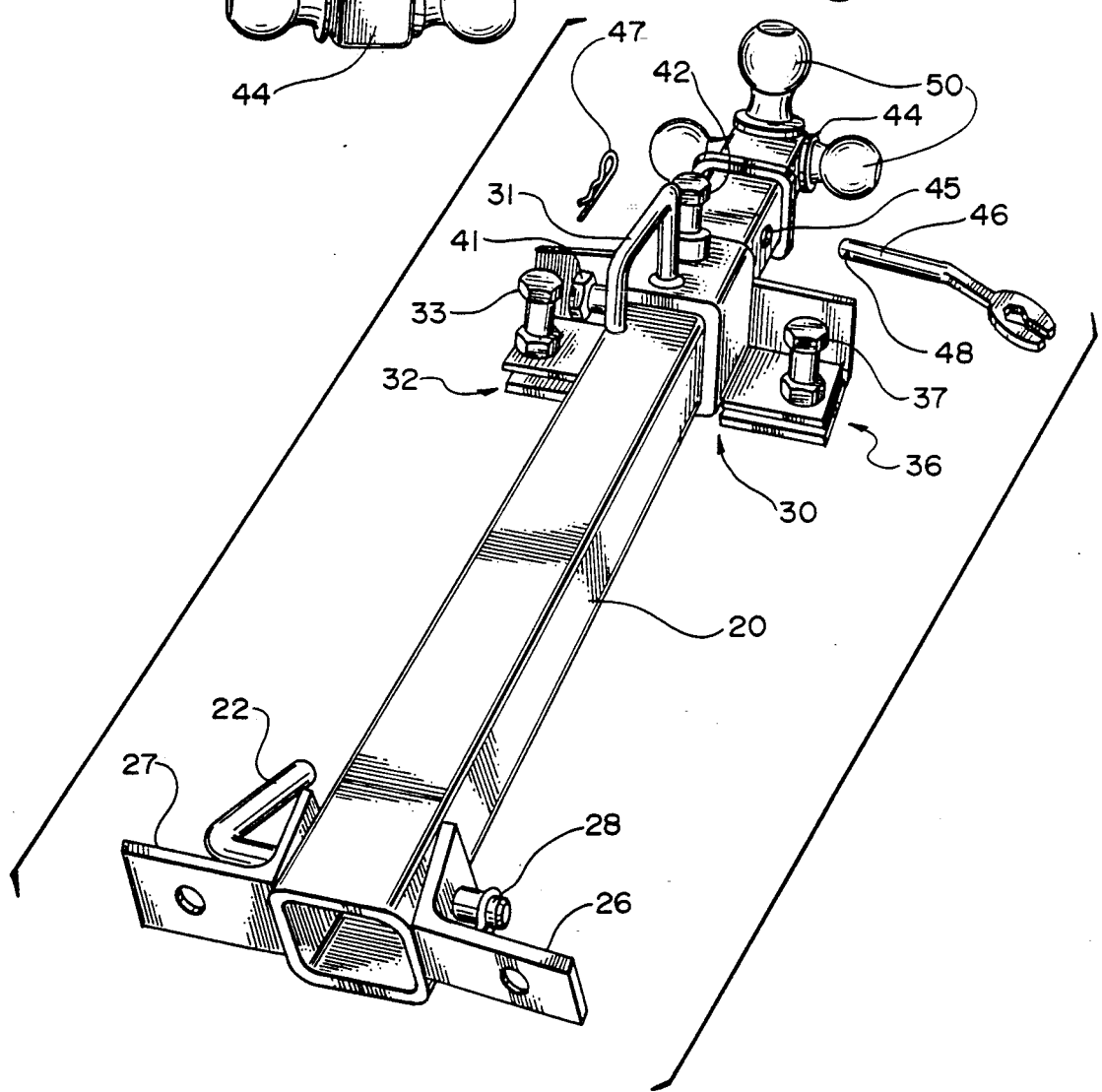

PORTABLE DRAFT BAR

FIELD OF THE INVENTION

1. Background of the Invention

This invention relates to portable draft bar appliances that are removably connectable to a horizontally-disposable surface of an earth-working implement mounted on a dirigible vehicle which may be freely transported about the earth's surface.

2. Prior Art

The following is a list of prior art noted in the course of a preliminary patentability search:

| Patent No. | Patentee | Issue Date | Title |
| --- | --- | --- | --- |
| 2,362,991 | Dahl | November 21, 1944 | TAIL WHEEL LIFTING ADAPTER FOR FORK TYPE TAIL WHEELS |
| 2,772,918 | Klinger | December 4, 1956 | DUMPING TRACTOR-TRAILER VEHICLE |
| 3,207,085 | Burr | September 21, 1965 | RAIL CAR SWITCHING METHOD |
| 3,583,061 | Adams | July 28, 1969 | FOR INSTALLING DRAFT GEAR |
| 4,037,681 | Gorby | July 26, 1977 | TOWABLE FRONT END LOADER |

Of these, the Gorby U.S. Pat. No. 4,037,681 is believed to be directly related to my invention in that a draft bar is attached to the bucket of a front end loader, although not designed to be used to move trailers and the like.

SUMMARY OF THE INVENTION

The object of my invention is to provide a readily portable draft bar for use with earth-moving implements which are adjustably disposed on a dirigible vehicle therefor, and which may have a surface that may be disposed in a horizontal plane. The draft bar is driveably connectable at its rear end to a mounting that may be permanently disposed within an earth-working implement adjacent the rear end of a surface and which is slidably disposed in a clamp that may be removably disposed and connected to the front end of the horizontal surface whereby a tri-axial stability of the draft bar is maintained under all conditions of operation while providing for easy removal and/or transfer to other earth-working implements of differing sizes and shape.

In an operable embodiment of my invention, one surface of the bucket on a front end loader may be provided, with a stationary hitch that is rigidly disposed within and adjacent the rear end of a horizontally disposable surface of the bucket and is equipped with connecting means, such as a draft pin, for receiving one end of a draft bar that is configured to be connected thereto by insertion of the pin so as to provide a rigid draft producing connection with the earth-moving implement. As may be seen, this is adequate for forward and aft and up and down forces, but is not particularly well-suited to the lateral forces as may be encountered in providing draft to a towed or driven vehicle, such as a trailer. The draft bar is suitably dimensioned to be slidably received in a clamping bracket which is provided with suitable clamping means for engaging a forward portion of the horizontal surface adjacent the forward end of the draft bar so as to rigidly connect the forward portion of the draft bar to the horizontal surface and thereby provide additional rigidity in an up and down direction and to effect a rigid connection that will prevent lateral displacement of the forward end of the draft bar. The rugged, simple connection to the earth-moving implement is accomplished through the use of connecting and mounting means which provide a minimum of interference with the normal operation of the earth-moving implement as well as providing improved portability so that the appliance may be used on a wide variety and number of vehicles.

It is therefore an object of my invention to provide a novel and unobvious portable draft appliance for application to earth-working implements adjustable-disposed on dirigible earth-moving vehicles.

Another object of my invention is to provide a versatile draft appliance for use with a front end loader to increase the versatility of front end loader devices so that they may be used to transport and position vehicular trailers.

These and other objects of my invention may become apparent from a consideration of the appended specification, claims, and drawings, in which:

FIG. 6 is a perspective view showing a further auxiliary draw bar configuration; and FIG. 7 is an exploded perspective view of the draft appliance of FIG. 6.

DESCRIPTION OF A PREFERRED EMBODIMENT

Figure 1:
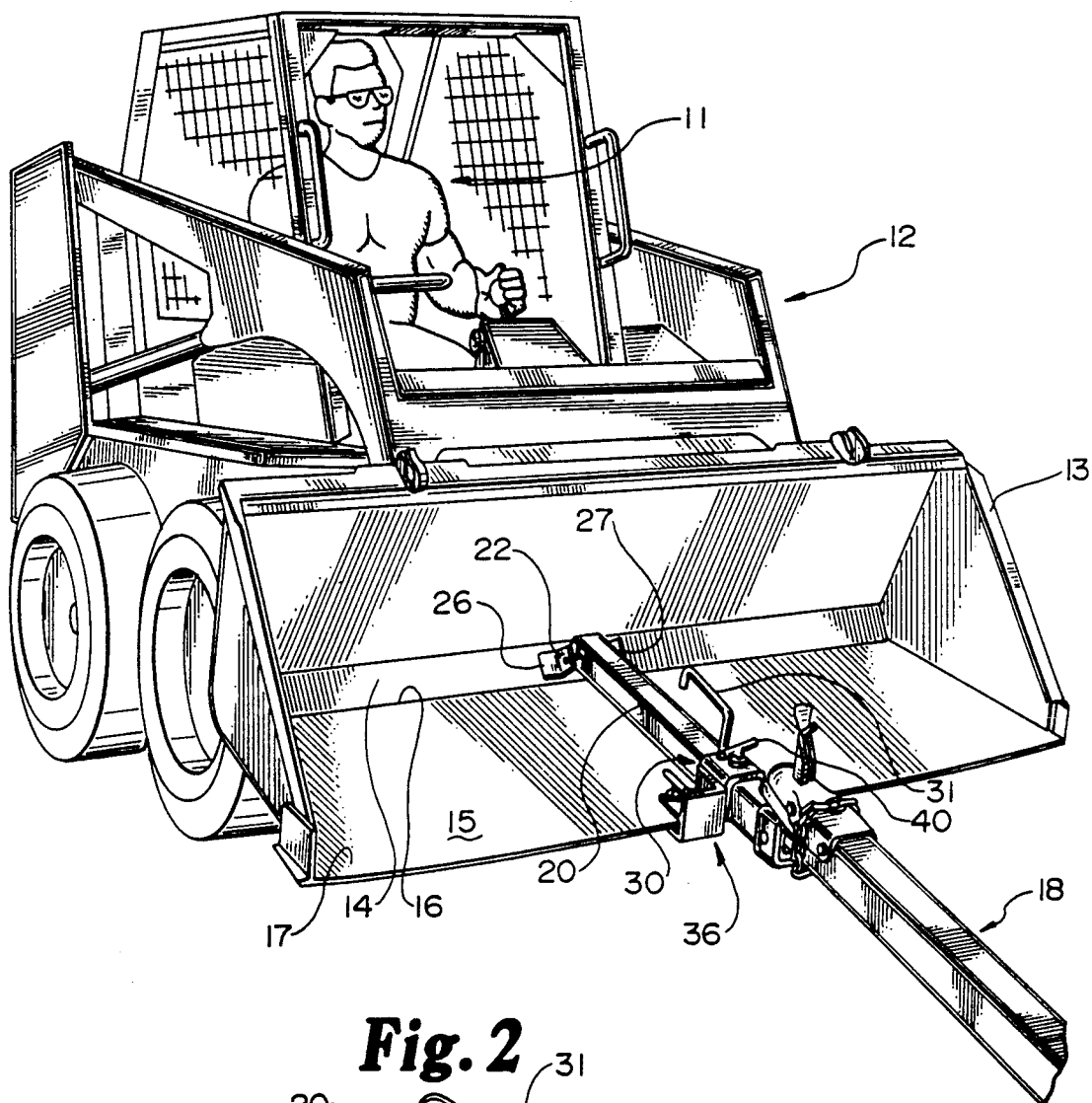
FIG. 1 is a perspective view of my invention shown disposed and in use on a typical dirigible earth-moving vehicle having a front end loader

With the exception of a few minor elements, FIGS. 1–7 of the drawings may be seen to constitute substantially one embodiment of my invention and where like elements provide like functions, they are identified with the same reference characters.

Referring to the drawings, FIG. 1 shows an earth working vehicle 10 that is intended to be controlled by an operator 10 and which, in the embodiment shown, is provided with a front end loader 12 which includes a bucket 13 having a bottom 14, side portions 13 and a bottom portion 14 that is adjacent a blade 15 having front and rear sides 16 and 17, respectively. A tow bar or tongue of a trailer is shown disposed adjacent of the front end of the vehicle and is identified by reference character 18, the remainder of the towed vehicle is left to the discretion and imagination of the reader.

Figure 2:
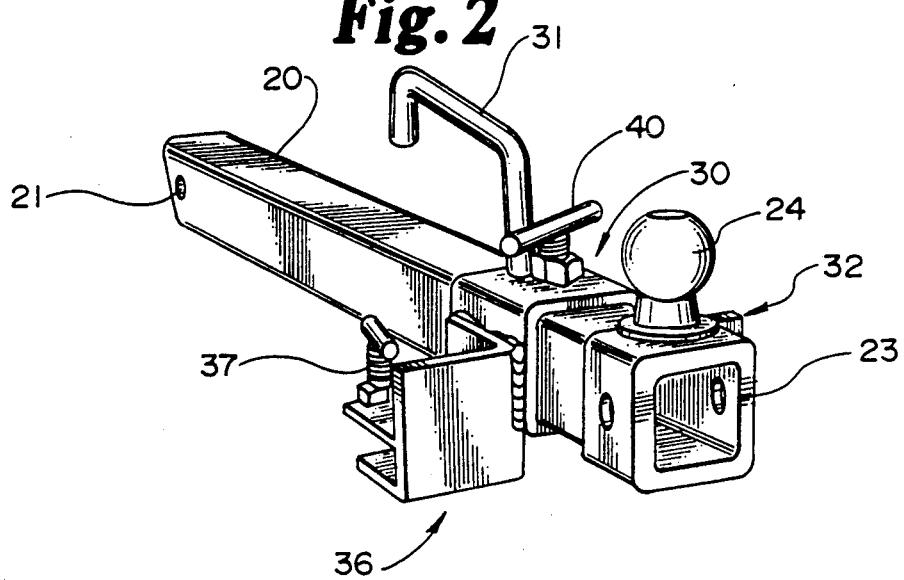
FIG. 2 is a perspective view of an embodiment of my invention.
Figure 3:
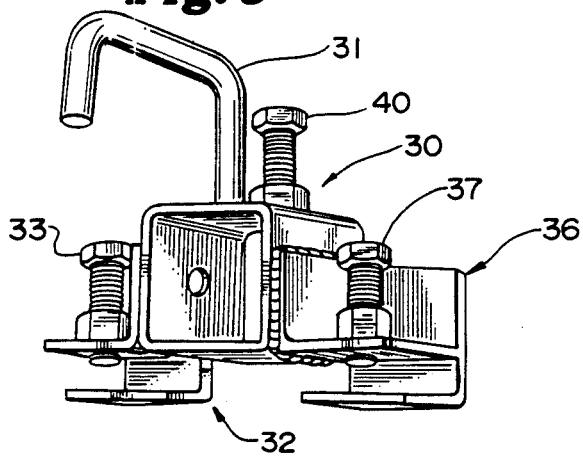
FIG. 3 is a detailed perspective view of a portion of my draft appliance.
Figure 4:
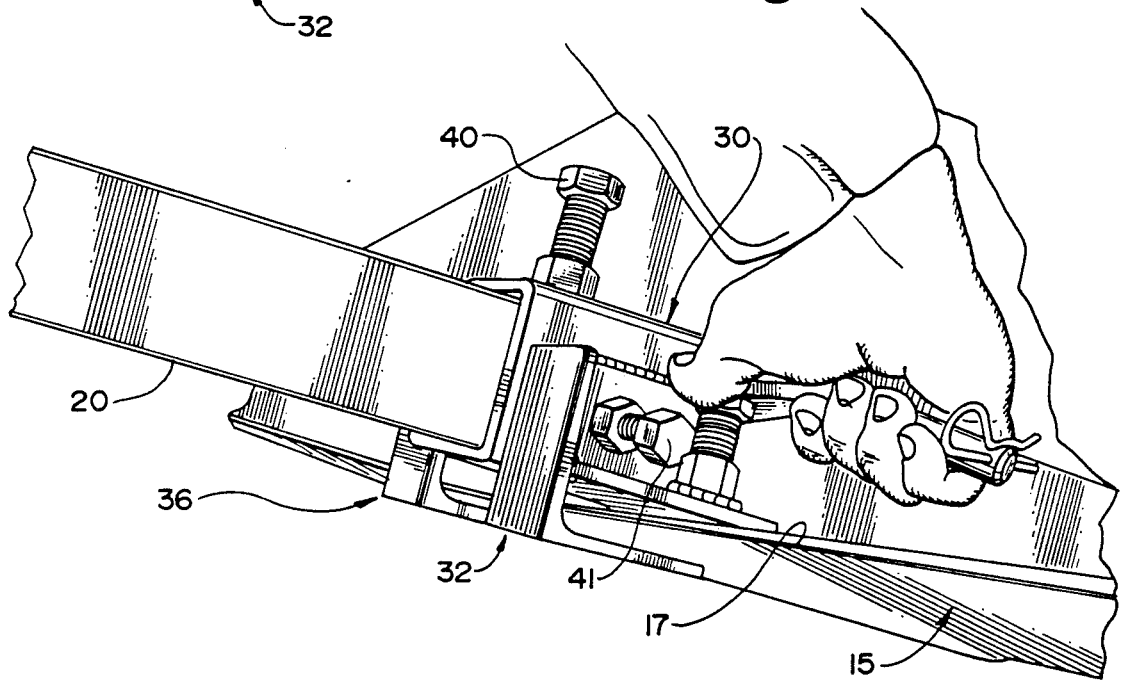
FIG. 4 is a fragmentary perspective view illustrating the installation of the clamp of FIG. 3.

In the drawings, my invention is shown comprising a hollow draft/drawbar 20 which is provided with a draft pin hole or bore 21 at its rear end and includes a collar-like enlarged end portion 23 upon which is disposed, as is shown in FIG. 2, a ball hitch 24. Front end 23 of draft bar 20 is shown provided with a plurality of laterally extending holes for receiving various and sundry coupling elements and it may be seen that ball 24 is likewise disposed in a suitable hole extending through the forward end of bar 20. A pair of draft transmitting rear mount members 26 and 27 are shown securely disposed on the bottom 14 of bucket 13 and are provided with aligned apertures for receiving draft bar pin 22 that may be suitably maintained in position by a draft bar pin safety pin 28. Rear mounting members 26 and 27 are shown comprised of L-shaped members having legs of differing lengths whereby they may be suitably mounted, as by welding, or the like, in the bottom 14 of a bucket 13 or similar earth working implements so as to accommodate different size and shape relationships as might be encountered in the use of my portable draft bar on diverse earthworking vehicles.

A clamp 30 having a handle 31 and right and left clamps 32 and 36, each having a clamp screw 33 and 37, respectively. In the embodiment shown in the drawings, right and left clamps 32 and 36 are shown disposed over and in engagement with the forward edge of side 17 of bucket 13 and the tightening of clamp screws 33 and 37 into engagement with the forward end 17 of blade 15 on bucket 13 serves to maintain clamp 30 against lateral movement with respect to blade 15 and thus to stabilize draft bar 20 in the position shown in the drawings. So as to permit a workable slidable relationship between clamp 30 and drawbar 20, the interior dimensions may be such as to allow easy sliding between the two members. Once the portable drawbar apparatus has been assembled to a vehicle, clamp 30 may be more or less permanently disposed in a workable position along the length of drawbar 20 through the use of top draft bar clamp screw 40 and side draft bar clamp screw 41.

Figure 5:
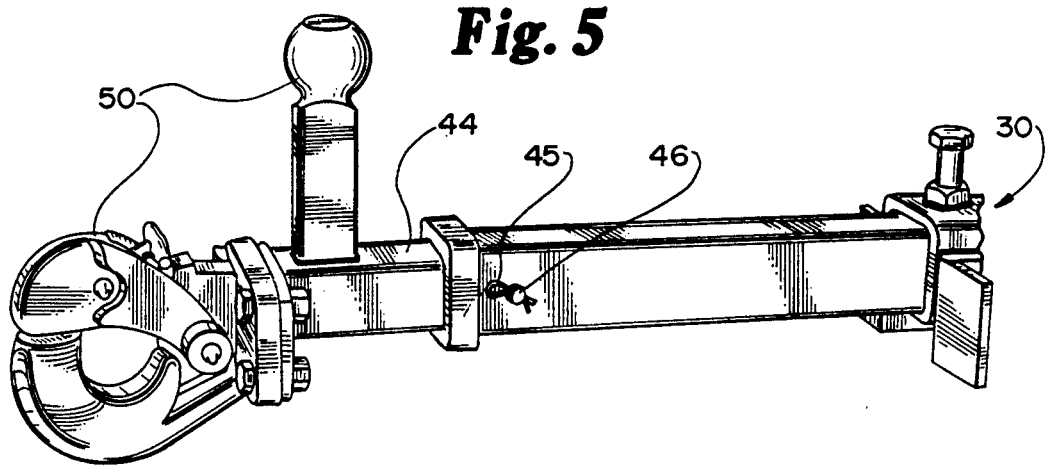
FIG. 5 is a fragmentary perspective view of a draft appliance showing an auxiliary draw bar configuration.

As shown in FIGS. 5, 6 and 7 of the drawings, an auxiliary bar 44 having one or more configurations of hitches 50 mounted at one end many be slidably received in drawbar 20 and may be held in place with an auxiliary bar pin 46 which extends through a hole 45 in an auxiliary bar 44 and which may be held in place through an auxiliary bar safety pin 47 which may be inserted through transverse hole 48 at one end of auxiliary bar pin 46.

OPERATION OF THE ILLUSTRATED EMBODIMENT

The initial installation of my portable drawbar on the bucket of an earthworking vehicle 10 consists of laying the assembly on the blade 15 of a bucket 13 on such a vehicle, as illustrated in FIG. 1 of the drawing, placing the rear mounting members 26 and 27 at a suitable location as determined by the geometries of the bar assembly and the bucket permanently, stationarily disposing or mounting rear mounts 26 and 27 in such position, as by welding, screw threaded fasteners or the like, tightening right and left clamp screws 33 and 37 and top and side draft bar clamp screws 40 and 41 and disposing an appropriately sized hitch, such as ball hitch 24 at the forward end of draft bar 20. The apparatus is now ready for connection to, for example, tongue 18, having suitable hitching means at its forward end, and earthworking vehicle 10 may be moved to the desired location.

When it is again desired to use the vehicle for its earthworking purposes, draft bar pin 22 is withdrawn from the rear end of draft bar 20, right and left clamp screws 33 and 37 are loosened and the entire assembly may be withdrawn forwardly of bucket 13 and placed in a safe location for future use.

I claim:

1. A removable drawbar for an earth-working implement of the class having a work surface capable of being positioned and maintained in a horizontal attitude at which a rear end of the earth-working surface is adjacent the front of a dirigible vehicle and another end extends forwardly therefrom, comprising, in combination:

a drawbar having front and back ends, said back end being adapted from draft transmitting connection to the rear end of a horizontally disposed surface of an earth working implement; and clamping means slidably disposed on said drawbar, said clamping means to clamp down on the drawbar and the front end of said horizontally disposed surface to stabilize the drawbar.

2. The subject matter of claim 1 in which an apertured connector is disposed adjacent the rear end of the work surface, the back end of the drawbar includes an aperture and draft pin means, said draft pin means extends through aligned apertures of the drawbar and connector.

3. The subject matter of claim 1 in which the clamping means includes a clamp to be removably engaged to the front end of the work surface and a further clamp that is engageable with the drawbar.

4. The subject matter of claim 2 in which the apertured connector is comprised of a pair of right angle members, each having first and second apertures, the first apertures being disposed a greater distance from one end of each member than the second apertures distance from the other end, one of said first or second apertures being disposed on the earth-working implement and the other of said first and second apertures being disposed in axial alignment to receive the rear end of the drawbar therebetween and the draft pin means therethrough.

5. The subject matter of claim 2 in which the clamping means includes a clamp to be removably engaged to the front of the work surface and a further clamp that is engageable with the drawbar.

6. The subject matter of claim 3 in which the apertured connector is comprised of a pair of right angle members, each having first and second apertures, the first apertures being disposed a greater distance from one end of each member than the second apertures distance from the other end, one of said first or second apertures being disposed on the earth-working implement and the other of said first and second apertures being disposed in axial alignment to receive the rear end of the drawbar therebetween and the pin means therethrough.

7. In combination with the bucket of a front end loader, a removable drawbar comprising, in combination:

an elongated bar member having front and back ends;
    mounting means stationarily connected to a rear portion of an earth-working bucket, said mounting means including means for removable connection to the back end of said elongated bar; and
    clamp means to clamp onto the front end of said bucket, said damping slidably disposed on said bar member.

* * * * *